(12) United States Patent
de Leon et al.

(10) Patent No.: US 6,631,303 B1
(45) Date of Patent: Oct. 7, 2003

(54) IMAGING COMPENSATION METHOD FOR OPTICAL POINTING DEVICES

(75) Inventors: Ceasar B. de Leon, Redmond, WA (US); Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/533,801

(22) Filed: Mar. 24, 2000

(51) Int. Cl.⁷ .............................................. G05B 15/00
(52) U.S. Cl. .............................. 700/85; 700/17; 700/83; 700/84; 700/59; 345/158; 345/156; 345/157; 345/163; 345/166; 345/167
(58) Field of Search ............................... 700/83, 84, 17, 700/85, 86, 59; 345/158–159, 163–166, 156–157, 167

(56) References Cited

U.S. PATENT DOCUMENTS

| | | | | |
|---|---|---|---|---|
| 5,793,359 A | * | 8/1998 | Ushikubo | ................... 345/169 |
| 5,850,340 A | * | 12/1998 | York | ........................... 700/83 |
| 5,854,621 A | * | 12/1998 | Junod et al. | ................ 345/158 |
| 5,930,732 A | * | 7/1999 | Domanik et al. | ............. 702/31 |
| 5,959,863 A | * | 9/1999 | Hoyt et al. | .................... 700/85 |
| 6,164,808 A | * | 12/2000 | Shibata et al. | ................ 700/85 |
| 6,195,592 B1 | * | 2/2001 | Schuler et al. | ................ 700/83 |
| 6,264,355 B1 | * | 7/2001 | Ives et al. | ..................... 700/85 |
| 6,300,940 B1 | * | 10/2001 | Ebina et al. | ................. 345/161 |
| 6,336,052 B1 | * | 1/2002 | Ouellet et al. | ................ 700/83 |
| 6,466,831 B1 | * | 10/2002 | Shibata et al. | ................ 700/85 |
| 6,482,010 B1 | * | 11/2002 | Marcus et al. | ................ 434/45 |
| 6,505,088 B1 | * | 1/2003 | Simkin et al. | ................ 700/85 |

* cited by examiner

*Primary Examiner*—Ramesh Patel
(74) *Attorney, Agent, or Firm*—Banner & Witcoff, Ltd.

(57) ABSTRACT

An imaging compensation or transformation method for signals detected by a sensor which is placed arbitrarily away from its ideal location into signals which would result if the sensor were in the ideal location. This method links movement of the on-screen cursor to the movement of the ball by a user. The actual location of the sensor in the device can be at any necessary location relative to the other components of the device within the housing, and the necessary transformation functions can be calculated and applied to the signals. Enabling placement of the sensor at a location which is displaced from the ideal location provides degrees of design freedom to optimize ergonomic and aesthetic factors. The compensation or conversion method is a transformation which simulates the sensor being disposed at the ideal location regardless of where it is actually placed. This is done by defining a user vector space, a sensor vector space and a reported vector space. The actuation of the ball occurs in the user vector space which corresponds a detected movement in the sensor vector space. The motion detected in the sensor vector space is transformed to movement in the reported vector space which simulates the movement of the ball as if the sensor were located in the ideal location.

18 Claims, 9 Drawing Sheets

IMAGING COMPENSATION METHOD FOR OPTICAL POINTING DEVICES

TECHNICAL FIELD

This invention relates generally to optical pointing devices and the compensation or conversion of the detected motion vectors when the sensor is displaced from an ideal location. More particularly, the invention provides a method for compensating or converting detected motion vectors detected by an optical motion sensor which is displaced from an ideal location into motion vectors which would be detected if the sensor were in the ideal location.

BACKGROUND OF THE INVENTION

Optical pointing devices typically include an optical motion sensor to detect motion by identifying a pattern on a reading surface and monitoring the relative movement of the pattern. One particular type of optical pointing device is an optical trackball which comprises a housing with a ball having a pattern that presents the reading surface, and an optical sensor. When the ball is manipulated by a user, the sensor detects motion of the ball by monitoring the movement of the pattern and outputs a signal to a controller to translate the movement of the ball by the user to the on-screen movement of a cursor or pointer. The device will enable movement of the cursor or pointer in a manner that the user expects due to the user's manipulation of the ball. In this manner, the movement of the on-screen cursor of a computing device is linked to the movement or rotation of the ball which is supported in the stationary housing.

In conventional optical pointing devices, the sensor is located directly opposite the point of user actuation. For typical optical trackballs, the ball is placed on the top of the housing or along a side of the housing for manipulation by a user's finger or thumb. Wherever the ball is placed, the sensor must be placed in a location which is diametrically opposed to the point of actuation. Since the balls are generally placed in sockets which expose a portion of the spherical surface, regardless of the actual orientation of the ball in the housing, the area furthest from the socket outline or the "top" area of the exposed spherical surface is generally the point of actuation. If the ball is manipulated from the top of a trackball housing, then the sensor must be below the ball. If the ball is manipulated from a side of the housing, then the sensor must be in diametrically opposed relation to the "top" of the ball. This diametrically opposed position is referred to as the ideal location of the sensor because no transformation calculations need be performed as the sensor detects the actual user motion vectors. The detected signals can be input into the controller to directly correlate into corresponding movements of the on-screen cursor.

A drawback of the conventional optical devices is that the optics or the lens and the electronics including the sensor are extremely sensitive to dust, dirt, liquid spills and other contaminants. Positioning the sensor at the ideal location makes it more susceptible to contaminants since the sensor is usually placed below the ball, and contaminants can fall down easily into the ball support and accumulate on the sensor.

Another drawback of the conventional optical devices is that the requirement of placing the sensor in the ideal location limits the design of the devices. In optical trackballs, ergonomic optimization and housing design may be limited due to the space and positioning constraints posed by the ideal location arrangement of the sensor. The concept of the ideal location of the sensor and its limitations is applicable to other optical pointing devices such as optical computer mice.

SUMMARY OF THE INVENTION

To overcome the problems of the conventional optical pointing devices, the present invention applies a transformation function to the signals detected by a sensor which is placed arbitrarily away from the ideal location. The received signals are compensated or converted to signals which would result if the sensor were in the ideal location in order to link the movement of the on-screen cursor to the movement of the ball of the optical trackball. In addition to solving space constraint issues in the hardware, this invention enables degrees of design freedom not possible with conventional devices.

The main drawbacks of conventional optical trackballs are overcome by positioning the sensor away from the ideal location. Since the ideal location many times coincides with a position where contaminants tend to accumulate, the present invention avoids the problems brought about by contaminants by positioning the sensor and supporting optics away from ideal location. Secondly, removing the requirement of sensor location enables optimization of ergonomic and industrial design considerations.

The present invention provides a compensation method which enables movement of the on-screen cursor that corresponds to a user's perception of the movement of the ball that he/she has manipulated. The actual location of the sensor in the device can be at any necessary location relative to the other components of the device within the housing, and the necessary transformation functions can be calculated and applied to the signals.

The compensation or conversion method enables the placement of the sensor at a location displaced from the ideal location while still producing output signals to a controller which are identical to those that would be produced if the sensor was at the ideal location. Broadly the compensation or conversion method is a transformation which simulates the sensor being disposed at the ideal location regardless of where it is actually placed. This is done by defining a user vector space, a sensor vector space and a reported vector space. The actuation of the ball occurs in the user vector space which corresponds to a detected movement in the sensor vector space. The motion detected in the sensor vector space is transformed to movement in the reported vector space which simulates the movement of the ball as if the sensor were located in the ideal location.

The present invention applies linear mappings or transformations which convert one vector space into another. A series of three non-cumulative transformations convert the motion vectors detected by the sensor in any arbitrary location into a set of motion vectors that the sensor would have detected had it been placed at the ideal location. The vector space transformations have been designed to allow for an uncomplicated measurement of the dimensions of the transformations from a computer-aided design software used to generate a mechanical model of the system. This readily enables generation of appropriate transformations for any design completed on the CAD system. Furthermore, the invention allows for the implementation of the mathematical calculations in a relative inexpensive, non-floating point microcontroller that has an instruction set which is not necessarily geared for complex mathematical computations. The method devised by the invention provides optimized accuracy given the constraints of microcontroller ROM sizes and mathematical capability.

DETAILED DESCRIPTION OF THE INVENTION

Figure 1:
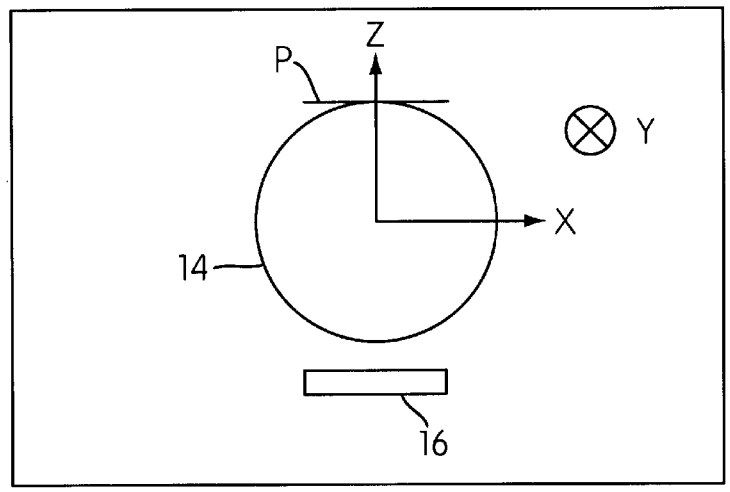
FIG. 1 is a schematic diagram of the conventional placement of a ball with the sensor in an ideal location.
Figure 2A:
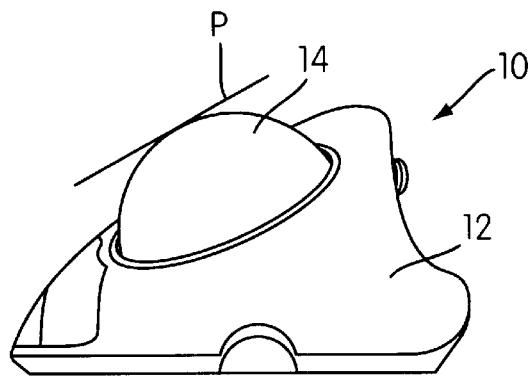
FIG. 2A is an end elevational view of an optical trackball device configured for manipulation of the ball by a user's fore, middle and/or ring fingers.
Figure 2B:
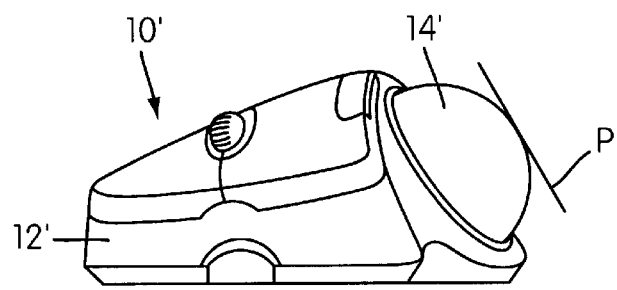
FIG. 2B is an end elevational view of an optical trackball device configured for manipulation of the ball by a user's thumb.

A conventional configuration of a ball and placement of the optical sensor at the ideal location is schematically illustrated in FIG. 1. The sensor is placed directly opposite to the user point of actuation P, and parallel to a plane tangent to the ball. Two examples of an optical trackball device 10 and 10' are illustrated in FIGS. 2A and 2B, each with a supporting housing 12, 12' and ball 14, 14'. The trackball shown in FIG. 2A is built so the ball is manipulated by the user's fingers. Any of the fore, middle or ring fingers or a combination thereof is typically used to manipulate the ball. The trackball shown in FIG. 2B is designed so the ball is manipulated by a user's thumb. The actual user point of actuation P is shown in FIGS. 2A and 2B. It is clear from FIGS. 2A and 2B that requiring placement of the optical sensor in the ideal location, i.e. diametrically opposed to the point of actuation, could be a design impediment which impacts negatively on ergonomic and aesthetic considerations. The present invention enables more design freedom than has been possible in the prior art by allowing for more flexible sizing of the ball as well as its placement and configuration on the trackball device.

Figure 3:
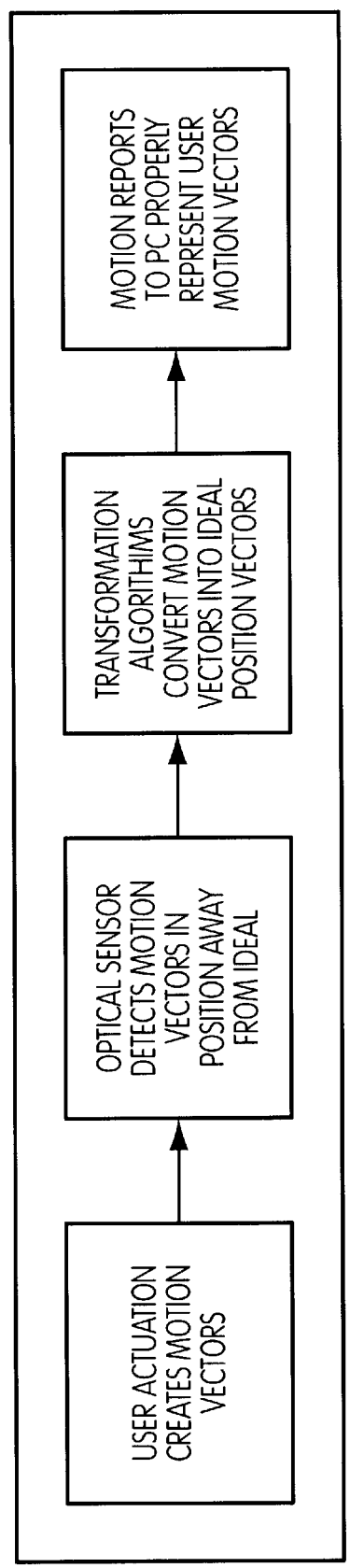
FIG. 3 is a block diagram of the transformation method of the present invention.

A block diagram showing an overview of the transformation method of the present invention is illustrated in FIG. 3. The sensor is preferably contained in an Application Specific Integrated Circuit that detects motion by optical means and generates motion reports. These packets are then read by a separate microcontroller. The microcontroller contains the firmware that, among other tasks, implements the transformation algorithms. The microcontroller also handles the creation and transmission of motion reports to the host computing device. The data path between the sensor and the microcontroller will hereinafter be referred to as the internal bus. The data path between the microcontroller and the host will be referred to as the device-to-host bus. In a particular embodiment, the host is a PC and the motion reports are generated in PS/2 format to be read by an 8-bit microcontroller.

The first block describes motion in User Vector Space, the second describes motion detected in Sensor Vector Space, the third block is the Cartesian Coordinate System (CCS) transformation and the fourth block is motion in Reported Vector Space, that is, motion reports from the input device to the host. The CCS transformation converts the motion detected in the Sensor Vector Space into motion in the Reported Vector Space. The motion described in the Reported Vector Space is a simulation of the motion which would be detected by the sensor if it were in the ideal location.

Figure 4:
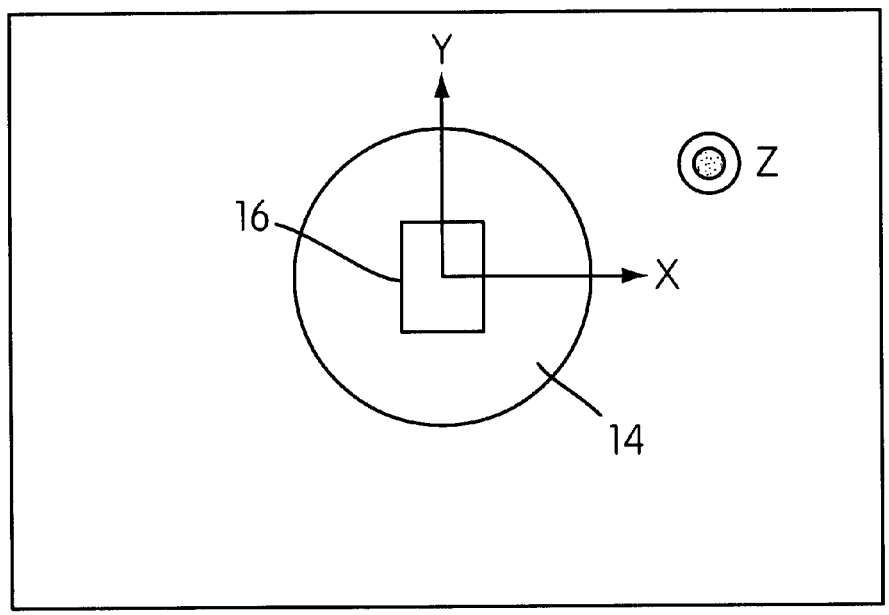
FIG. 4 is a schematic diagram of the Cartesian Coordinate System used to define user motion vectors.

FIG. 4 is a schematic illustration similar to FIG. 1 in which the configuration of FIG. 1 is rotated 90° about the x-axis. FIG. 4 schematically illustrates a three dimensional CCS which defines user motion vectors. The CCS will be used to describe the mathematical derivation of the transformation which converts the actual detected motion of the ball with the sensor in an arbitrary location into the motion which would have been detected with the sensor in the ideal location.

Mathematical Derivation

Figure 5:
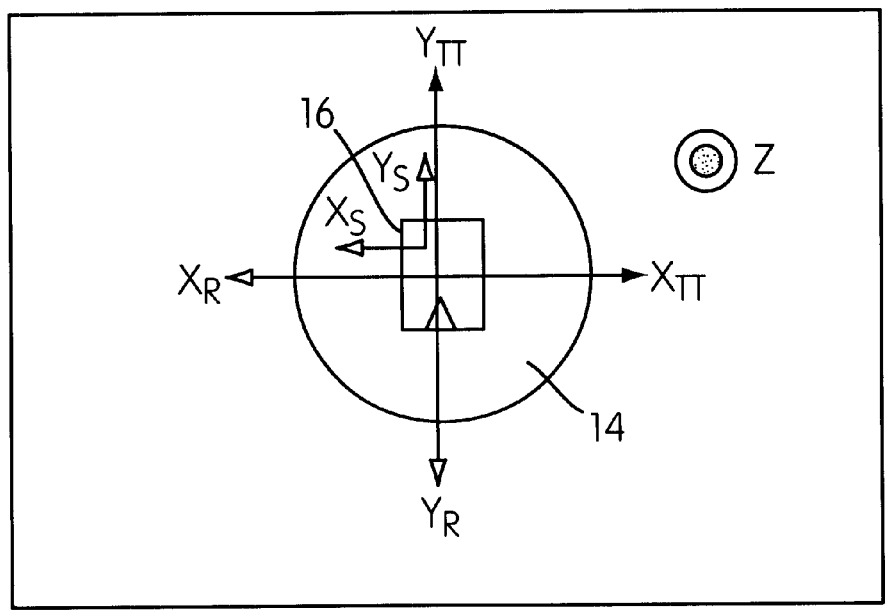
FIG. 5 is a schematic diagram of the coordinate and sign conventions.

Reference is made to FIGS. 5–10 which schematically illustrate the locations and coordinates relevant to the mathematical derivation of the transformation equation. The objective is to determine a mathematical relationship between the ideal location of the sensor and any point in a three-dimensional (3-D) space. FIG. 5 shows the coordinate and sign conventions used as follows.

$X_U$, $Y_U$, $Z_U$=3-D Cartesian coordinate system (CCS) for the user;

$X_R$, $Y_R$=the User CCS mirrored onto the ball; direction of movement of the ball, as seen on the sensor plane, that should cause positive motion reports;

$X_S$, $Y_S$=sensor CCS; the direction of movement of the target surface relative to the sensor that causes positive counts to be reported by the sensor;

$N_{XS}$, $N_{YS}$=the number of counts, positive or negative, detected by the sensor for any user motion vector, along the $X_S$-axis for $N_{XS}$, and along the $Y_S$-axis for $N_{YS}$;

$N_{XR}$, $N_{YR}$=the number of counts, positive or negative, reported by the input device to the host for any user motion vector, along the User X-axis for $N_{XR}$, and along the User Y-axis for $N_{YR}$; and Counter Clockwise (CCW) rotation is positive (trigonometry standard).

Figure 6:
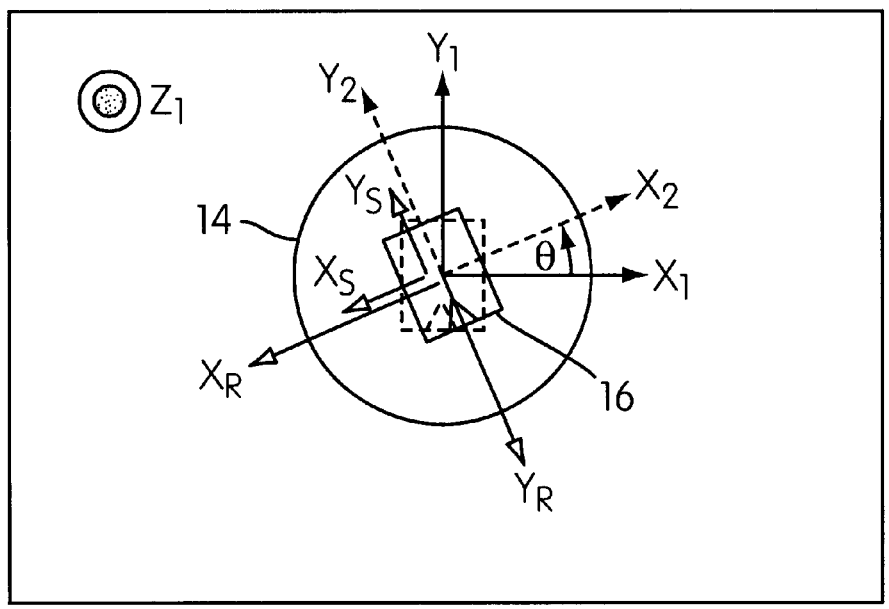
FIG. 6 is a schematic diagram showing the rotation of the sensor around the User Z axis.

To begin the derivation, Step 1, the sensor is rotated CCW around the User Z-axis by an angle θ, as illustrated in FIG. 6. The mathematical relationship is best represented by transforming the vector space $X_2 Y_2$ into the vector space $X_1 Y_1$. The following equation describes the transformation:

$X_1 = X_2 \cos θ - Y_2 \sin θ$ $Y_1 = X_2 \sin θ + Y_2 \cos θ$

The θ-rotation matrix is defined by:

$$\vec{R}_θ = \begin{bmatrix} \cos θ & -\sin θ \\ \sin θ & \cos θ \end{bmatrix}$$

The motion vectors detected by the sensor at vector space $X_2 Y_2$ are converted to the motion vectors that would have been detected by the sensor had it been positioned in vector space $X_1Y_1$ by the application of the above equations.

Figure 7:
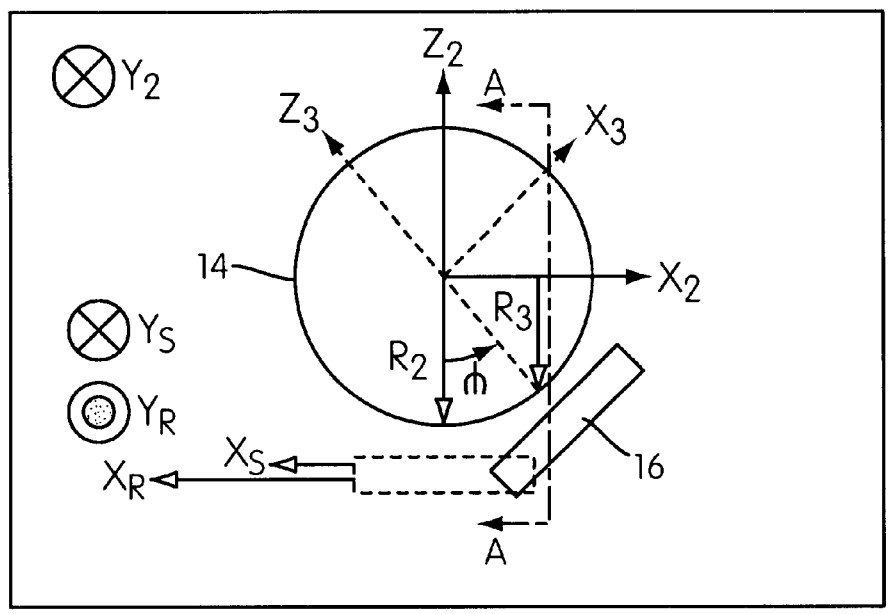
FIG. 7 is a schematic diagram showing the rotation of the sensor around the $Y_2$-axis.

The sensor is then rotated around the $Y_2$-axis by an angle $\phi$, CCW positive, Step 2 of the transformation, from vector space $X_2Y_2$ to vector space $X_3Y_3$. Referring to FIG. 7, $R_2$ defines the radius of the circular path of motion around the $X_2$ axis. This is the motion that the sensor detects while in the $X_2Y_2$ vector space. When the sensor is in the $X_3Y_3$ vector space, the circular path of motion it sees is that around the $X_2$ axis with a radius of $R_3$.

Figure 8:
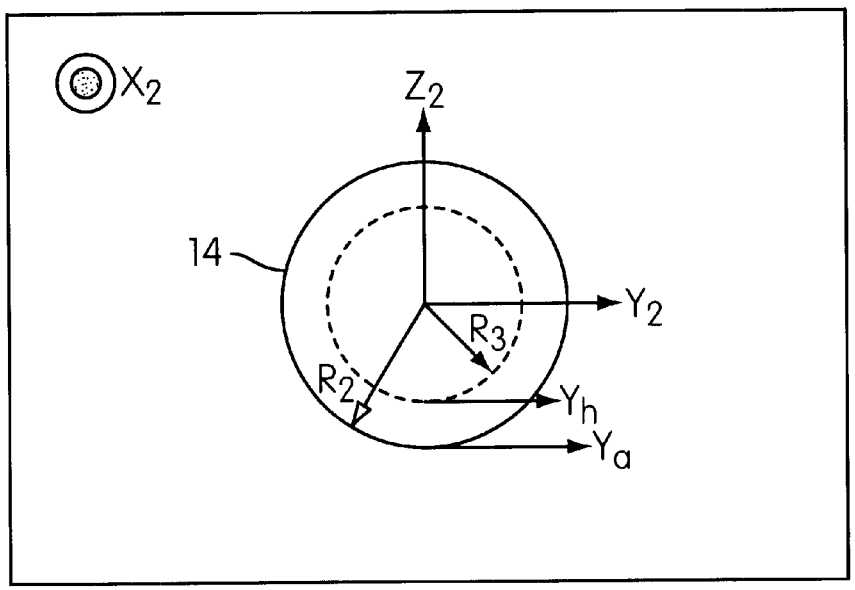
FIG. 8 is a schematic diagram of the section along line A—A of FIG. 7.
Figure 9:
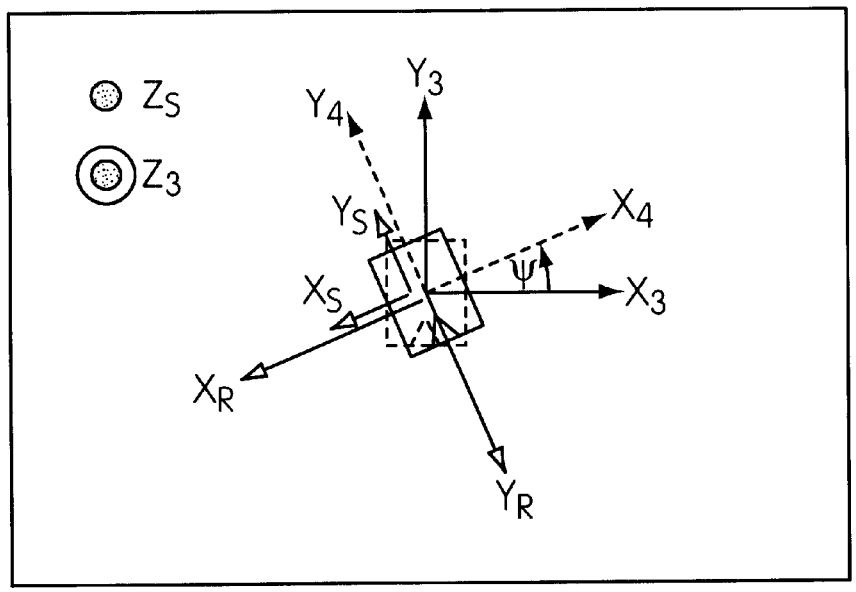
FIG. 9 is a schematic diagram showing the rotation of the sensor around the $Z_S$-axis.
Figure 10:
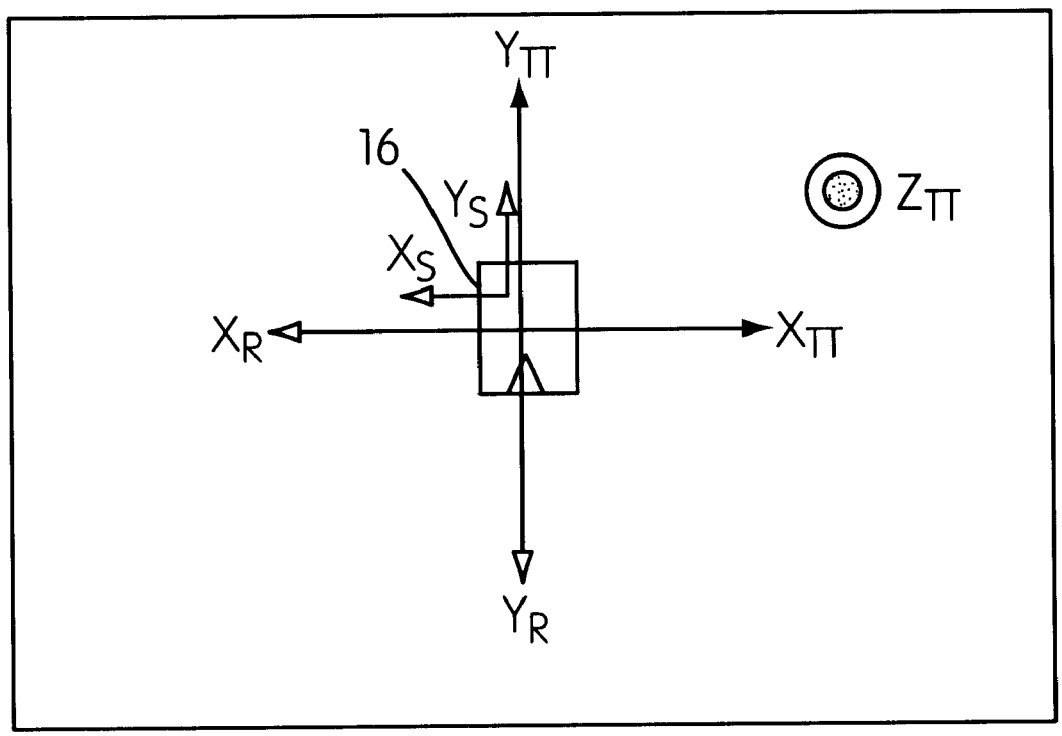
FIG. 10 is a schematic diagram showing $X_S Y_S$ aligning with $X_R Y_R$

FIG. 8 illustrates the Section along line A—A in FIG. 7, and shows the magnitude of the motion detected by the sensor along the Y-axis decreases as it is moved from vector space $X_2Y_2$ to vector space $X_3Y_3$. No magnitude changes occur along the X-axis. Furthermore, no direction changes occur as a result of this transposition.

Step 2 exhibited vector direction changes in both axes, with no vector magnitude change, therefore Step 3 is a scaling matrix for Y vectors. The movement $Y_b$ is that seen by the sensor positioned in vector space $X_3Y_3$ for a corresponding vector movement $Y_a$ occurring in vector space $X_2Y_2$. Their relationship is described by the following equation:

$$Y_a = \left(\frac{1}{\cos\Phi}\right) * Y_b$$

$$X_2 = X_3$$

$$Y_2 = \left(\frac{1}{\cos\Phi}\right) * Y_3$$

The $\phi$-scaling matrix is therefore:

$$\vec{S}_\Phi = \begin{bmatrix} 1 & 0 \\ 0 & 1/\cos\Phi \end{bmatrix}$$

From vector space $X_3Y_3$, the sensor is rotated around $Z_S$ by an angle $\psi$, CCW positive. The new vector space is arbitrarily named $X_4Y_4$. Transforming vector space $X_4Y_4$ into vector space $X_3Y_3$ renders the following $\psi$-rotation matrix:

$$\vec{R}_\Psi = \begin{bmatrix} \cos\Psi & -\sin\Psi \\ \sin\Psi & \cos\Psi \end{bmatrix}$$

The final step of the transformation, Step 4, aligns the counts detected by the sensor ($X_SY_S$ CCS) with the Mirrored User CCS ($X_RY_R$ CCS). This ensures that the motion reports to the sensor are of the proper polarity. The following equation describes the transformation:

$$X_4 = X_5$$

$$Y_4 = -Y_5$$

$$\vec{S}_A = \begin{bmatrix} 1 & 0 \\ 0 & -1 \end{bmatrix}$$

The over-all transformation matrix is:

$$\begin{bmatrix} X_R \\ Y_R \end{bmatrix} = \vec{R}_\theta \vec{S}_\Phi \vec{R}_\Psi \vec{S}_A \begin{bmatrix} X_S \\ Y_S \end{bmatrix}$$

$$\begin{bmatrix} X_R \\ Y_R \end{bmatrix} = \begin{bmatrix} \cos\theta & -\sin\theta \\ \sin\theta & \cos\theta \end{bmatrix} \begin{bmatrix} 1 & 0 \\ 0 & 1/\cos\Phi \end{bmatrix} \begin{bmatrix} \cos\Psi & -\sin\Psi \\ \sin\Psi & \cos\Psi \end{bmatrix} \begin{bmatrix} 1 & 0 \\ 0 & -1 \end{bmatrix} \begin{bmatrix} X_S \\ Y_S \end{bmatrix}$$

The reduced equation is:

$$\begin{bmatrix} X_R \\ Y_R \end{bmatrix} = \begin{bmatrix} \cos\theta\cos\Psi - (\sin\theta\sin\Psi/\cos\Phi) & \cos\theta\sin\Psi + (\sin\theta\cos\Psi/\cos\Phi) \\ \sin\theta\cos\Psi + (\cos\theta\sin\Psi/\cos\Phi) & \sin\theta\sin\Psi - (\cos\theta\cos\Psi/\cos\Phi) \end{bmatrix} \begin{bmatrix} X_S \\ Y_S \end{bmatrix}$$

The same mathematical relationship applies for detected sensor counts and reported counts as expressed in the transformation equation below.

$$\begin{bmatrix} N_{XR} \\ N_{YR} \end{bmatrix} = \begin{bmatrix} \cos\theta\cos\Psi - (\sin\theta\sin\Psi/\cos\Phi) & \cos\theta\sin\Psi + (\sin\theta\cos\Psi/\cos\Phi) \\ \sin\theta\cos\Psi + (\cos\theta\sin\Psi/\cos\Phi) & \sin\theta\sin\Psi - (\cos\theta\cos\Psi/\cos\Phi) \end{bmatrix} \begin{bmatrix} N_{XS} \\ N_{YS} \end{bmatrix}$$

The transformation equation thus converts the sensor counts into reported counts for a sensor placed away from the ideal location.

Firmware Implementation and Algorithms

There are multiple algorithms by which the transformations can be implemented in the microcontroller firmware. One of the limiting parameters of the present invention is that the preferred microcontroller contains only adds and shifts. Since it cannot perform complex mathematical operations, look-up tables have been used to implement the transformation equation. In the look-up tables, INT(x+0.5) refers to the calculation of the integer part of x+0.5. Therefore x is rounded to the nearest integer. The use of look-up tables also means that the ROM size of the microcontroller must be considered in determining an appropriate algorithm to employ. Various algorithms were evaluated for performance using various criteria involving compromises between performance and resource.

In determining the appropriate algorithms, the following conventions and assumptions are followed. From the transformation equation, let:

$a = \cos\theta \cos\Psi - (\sin\theta \sin\Psi/\cos\Phi)$ $b = \cos\theta \sin\Psi + (\sin\theta \cos\Psi/\cos\Phi)$ $c = \sin\theta \cos\Psi + (\cos\theta \sin\Psi/\cos\Phi)$ $d = \sin\theta \sin\Psi - (\cos\theta \cos\Psi/\cos\Phi)$ $$A = \begin{bmatrix} a & b \\ c & d \end{bmatrix}$$

Therefore, $$\begin{bmatrix} N_{XR} \\ N_{YR} \end{bmatrix} = \begin{bmatrix} a & b \\ c & d \end{bmatrix} \begin{bmatrix} N_{XS} \\ N_{YS} \end{bmatrix}$$

which is referred to hereinafter as shortened transformation equation. In the system of the preferred embodiment, the following system assumptions which reflect the system's parameters are made to simplify calculations.

(1) maximum tracking speed is 7 inches per second;
(2) tracking resolution is 400 counts per inch; and
(3) the worst case report rate occurs at 10 Hz +/− −10%=9 Hz, which is the slowest rate available with PS/2.

Further, the maximum number of counts between two reports, per axis, is determined to be $N_{MAX}$=7*400/9= 311.11. Thus, $N_{MAX}$ is 312.

One algorithm which was developed for the present invention is referred to hereinafter as the maximum algorithm or MAX and employs the look-up reproduced below as Table 1. The last row in Table 1 is $N_{MAX}$ which correlates to the maximum movement that the sensor can detect between two successive reports.

TABLE 1

|  | Column 1 | Column 2 | Column 3 | Column 4 |
|---|---|---|---|---|
| Row 0 | INT (a*0 + 0.5) | INT (b*0 + 0.5) | INT (c*0 + 0.5) | INT (d*1 + 0.5) |
| Row 1 | INT (a*1 + 0.5) | INT (b*1 + 0.5) | INT (c*1 + 0.5) | INT (d*1 + 0.5) |
| ... | ... | ... | ... | ... |
| Row η | INT (a*η + 0.5) | INT (b*η + 0.5) | INT (c*η + 0.5) | INT (d*η + 0.5) |
| ... | ... | ... | ... | ... |
| Row 312 | INT(a*312 + 0.5) | INT(b*312 + 0.5) | INT(c*312 + 0.5) | INT(d*312 + 0.5) |

MAX is implemented using the following steps:
1. sensor detects $N_{XS}$ and $N_{YS}$;
2. sx←sign($N_{XS}$), sy←sign ($N_{YS}$); $N_{XS}$←|$N_{XS}$|, $N_{YS}$←|$N_{YS}$|;
3. go to row $N_{XS}$;
4. from Column 1, retrieve the value of a* $N_{XS}$;
5. from Column 3, retrieve the value of c* $N_{XS}$;
6. go to row $N_{YS}$;
7. from Column 2, retrieve the value of b* $N_{YS}$;
8. from Column 4, retrieve the value of d* $N_{YS}$;
9. calculate $N_{XR}$=sx* a* $N_{XS}$+sy* b* $N_{YS}$;
10. calculate $N_{YR}$=sx* c* $N_{XS}$+sy* d* $N_{YS}$.

The maximum algorithm requires 1252 bytes for its look-up table and comprises four read operations and two add operations.

Another algorithm employed in the present invention is one that is referred to hereinafter as the small moves algorithm or SM. SM is superior for small user movements, normally where the counts $\leq$15. This will be the region where error is most noticeable to the user. SM algorithm, which takes up the most resources, improves performance in this region. In addition, SM algorithm is premised on the fact that there is only one possibility of improving the accuracy for small movements, and this is the elimination of one round-off error introduced by the addition operation. This can be achieved by using a table that yields the value $N_{XR}$ given $N_{XS}$ and $N_{YS}$. The ROM requirements of this algorithm, in terms of table size, is enormous relative to all the other algorithms, and because of this, it is feasible to use it only for small movements, that is, for counts not exceeding 15. For counts greater than 15, a different algorithm should be employed.

The following look-up tables are employed by the SM algorithm to calculate the indicated values. Each of Tables 2–5 occupies 16 rows by 16 columns which equals 256 bytes of ROM.

Table 2 is used to calculate $N_{XR}$ for $N_{XS}$* $N_{YS}\geq$0.

TABLE 2

|  | Column 0 (0x00) | Column 1 (0x01) | ... | Columm 15 (0x0F) |
|---|---|---|---|---|
| Row 0 (0x00) | INT(a*0 + b*0) | INT(a*0 + b*1) | ... | INT(a*0 + b*15) |
| Row 1 (0x01) | INT(a*1 + b*0) | INT(a*1 + b*1) | ... | INT(a*1 + b*15) |
| Row 2 (0x02) | INT(a*2 + b*0) | INT(a*2 + b*1) | ... | INT(a*2 + b*15) |
| ... | ... | ... | ... | ... |
| ROW 15 (0x0F) | INT(a*15 + b*0) | INT(a*15 + b*1) | ... | INT(a*15 + b*15) |

Table 3 is used to calculated $N_{XR}$ for $N_{XS}$* $N_{YS}$<0.

TABLE 3

|  | Column 0 (0x00) | Column 1 (0x01) | ... | Columm 15 (0x0F) |
|---|---|---|---|---|
| Row 0 (0x00) | INT(a*0 − b*0) | INT(a*0 − b*1) | ... | INT(a*0 − b*15) |
| Row 1 (0x01) | INT(a*1 − b*0) | INT(a*1 − b*1) | ... | INT(a*1 − b*15) |
| Row 2 (0x02) | INT(a*2 − b*0) | INT(a*2 − b*1) | ... | INT(a*2 − b*15) |
| ... | ... | ... | ... | ... |
| ROW 15 (0x0F) | INT(a*15 − b*0) | INT(a*15 − b*1) | ... | INT(a*15 − b*15) |

Table 4 is used to calculate $N_{YR}$ for $N_{XS}$* $N_{YS}\geq$0.

TABLE 4

|  | Column 0 (0x00) | Column 1 (0x01) | ... | Columm 15 (0x0F) |
|---|---|---|---|---|
| Row 0 (0x00) | INT(c*0 + d*0) | INT(c*0 + d*1) | ... | INT(c*0 + d*15) |
| Row 1 (0x01) | INT(c*1 + d*0) | INT(c*1 + d*1) | ... | INT(c*1 + d*15) |
| Row 2 (0x02) | INT(c*2 + d*0) | INT(c*2 + d*1) | ... | INT(c*2 + d*15) |
| ... | ... | ... | ... | ... |
| ROW 15 (0x0F) | INT(c*15 + d*0) | INT(c*15 + d*1) | ... | INT(c*15 + d*15) |

Table 5 is used to calculate $N_{YR}$ for $N_{XS}$* $N_{YS}$<0.

TABLE 5

|  | Column 0 (0x00) | Column 1 (0x01) | ... | Columm 15 (0x0F) |
|---|---|---|---|---|
| Row 0 (0x00) | INT(c*0 − d*0) | INT(c*0 − d*1) | ... | INT(c*0 − d*15) |
| Row 1 (0x01) | INT(c*1 − d*0) | INT(c*1 − d*1) | ... | INT(c*1 − d*15) |
| Row 2 (0x02) | INT(c*2 − d*0) | INT(c*2 − d*1) | ... | INT(c*2 − d*15) |
| ... | ... | ... | ... | ... |
| ROW 15 (0x0F) | INT(c*15 − d*0) | INT(c*15 − d*1) | ... | INT(c*15 − d*15) |

The SM algorithm is implemented using the following steps.
1. sensor detects $N_{XS}$ and $N_{YS}$;
2. if $N_{XS}>16$ or $N_{YS}>16$ then use one of the other algorithms, else proceed to next step
3. $sx \leftarrow sign(N_{XS})$, $sy \leftarrow sign(N_{YS})$; $N_{XS} \leftarrow |N_{XS}|$, $N_{YS} \leftarrow |N_{YS}|$;
4. if $sy*sy \geq 0$ then use Table 2 and Table 4; if $sy*sy<0$ then use Table 3; and Table 5;
5. go to row $N_{XS}$ and column $N_{YS}$ in Table 2 (or 3);
6. retrieve the value of $a* N_{XS}+b* N_{YS}$;
7. if $sx<0$ then $N_{XR}=sx*(a* N_{XS}+b* N_{YS})$; if $sx>0$ then $N_{XR}=a* N_{XS}+b* N_{YS}$;
8. go to row $N_{XS}$ and column $N_{YS}$ in Table 4 (or 5).
9. retrieve the value of $c* N_{XS}+d* N_{YS}$;
10. if $sx<0$ then $N_{YR}=sx*(c* N_{XS}+d* N_{YS})$; if $sx>0$ then $N_{YR}=c* N_{XS}+d* N_{YS}$.

The SM algorithm offers greater accuracy but has a higher ROM requirement than other algorithms which were considered. To compromise between performance and resource parameters, a combination of the MAX and the SM algorithm achieves a good balance of accuracy for small user movements and conservation of resources in the system. The two algorithms which are used are the SM and MAX-SM for small moves and MAX for larger moves where the count>15.

The current maximum number of counts per report of 312 still results in tables that are too large in implement in a relatively inexpensive microcontroller. The maximum number of counts is a function of the tracking resolution, speed and report rate. The lower the report rate, the more counts accumulated. To reduce table size, therefore, the internal bus report rate should be increased and should be made independent of the host-input device report rate. Due to this relationship, it is preferred to use the SM algorithm for $N_{XS} \leq 15$ and $N_{YS} \leq 15$, and the MAX algorithm for all other counts. In addition, the internal bus report rate should be set to 100 Hz, regardless of the host-input device report rate. This will ensure that the demands of performance and system resources are appropriately balanced while keeping costs down.

Once the appropriate algorithms are determined for implementing the transformations from the user vector space to the sensor vector space to produce the reported vector space, a number of additional parameters and performance algorithms must be selected.

The values of the three angles of rotation in the CCS described above $\theta$, $\phi$ and $\psi$ are also subject to the firmware parameters. Because the table entry values should fit into 1-byte, that is have values less than or equal to 255, the values for these angles are restricted. Given this parameter, it was determined that $\phi$ had the most critical effect on restricting the range of values for $\theta$ and $\psi$. In other words, even a slight increase in $\phi$ resulted in restriction of the selection possibilities for $\theta$ and $\psi$. This indicates that displacement of the sensor away from the ideal location which requires increasing the value of $\phi$ is a physical design parameter on the arrangement of the optical trackball components within the housing.

FIGS. 11-16 illustrate schematically the sensor's view of the displacement of a pattern in various situations. These figures demonstrate that increasing values of s results in increased compression of the pattern. For convenience of explanation, the figures illustrate the sensor's view after the CCS transformation has taken place. The ball is moved in the User CCS over a distance $(X_0, Y_0)$ which is expressed in number of counts. The start point is $C(0,0)$ and the end point is $P(X_0, Y_0)$. The sensor sees a movement starting from the origin of the Sensor CCS, $O(0,0)$ and ending in a point with coordinates $(X_S, Y_S)$.

Figure 11:
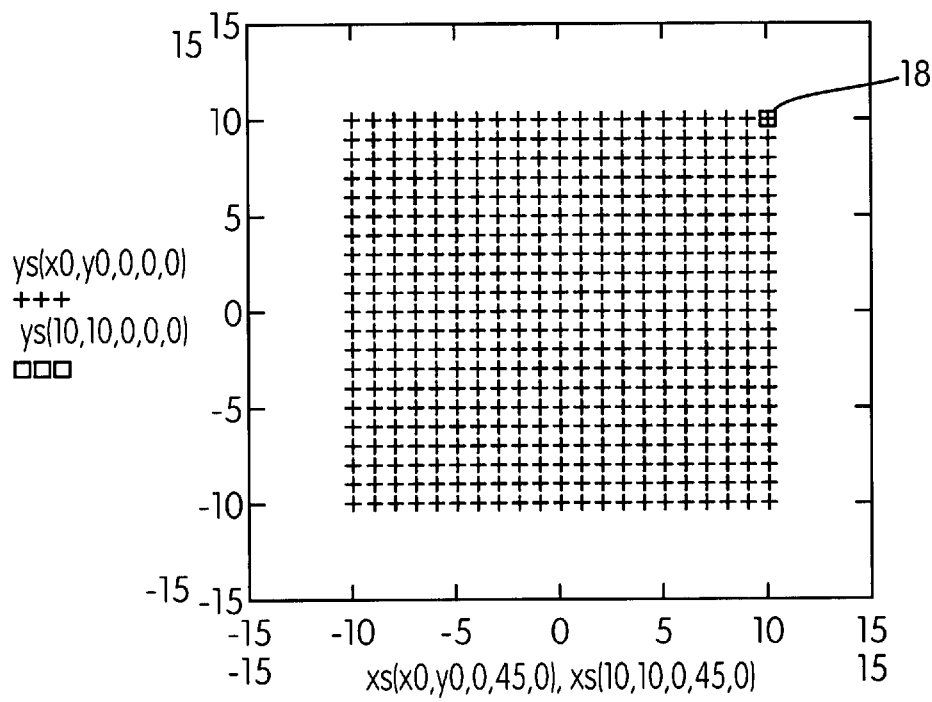
FIG. 11 is a schematic diagram of the sensor's view of an image with the sensor in the ideal position.
Figure 12:
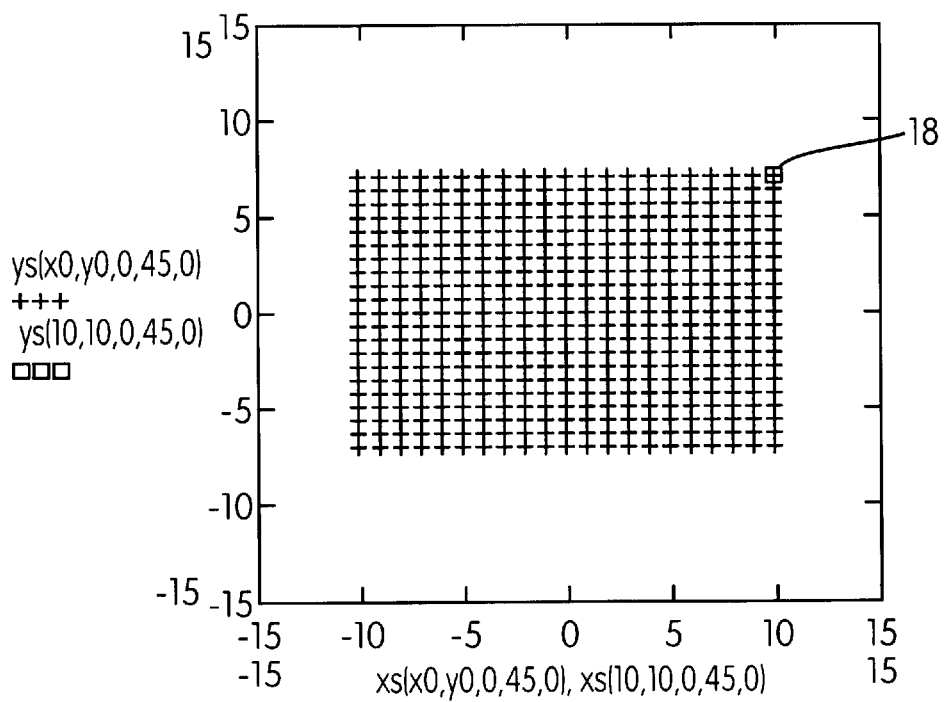
FIG. 12 is a schematic diagram of the sensor's view of an image with the sensor rotated 45° around the $Y_2$-axis.
Figure 13:
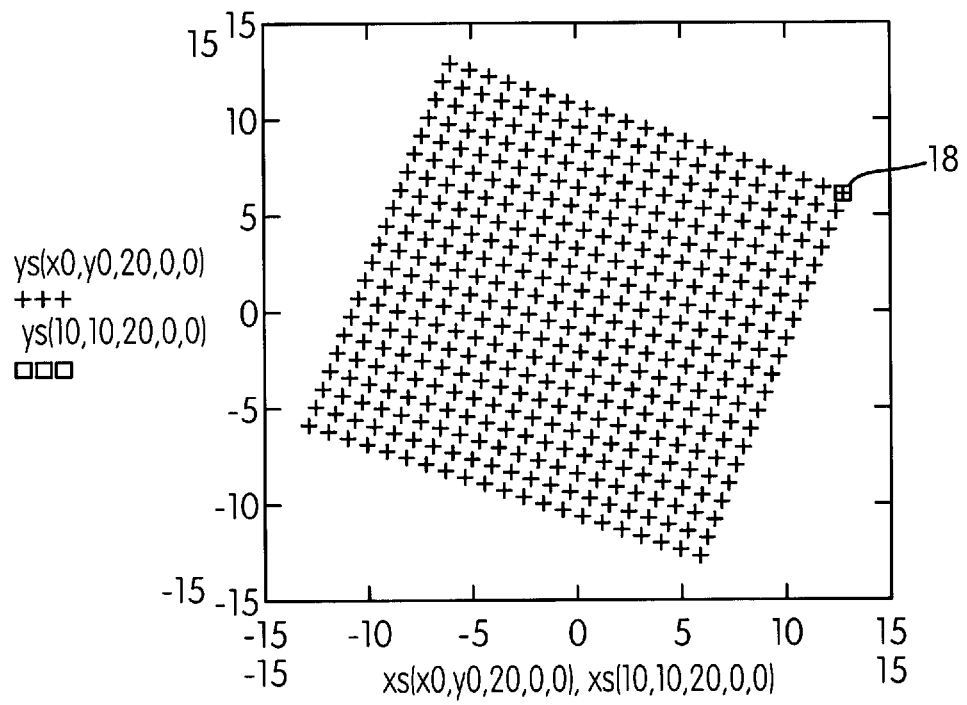
FIG. 13 is a schematic diagram of the sensor's view of an image with the sensor rotated 20° around the User Z axis.
Figure 14:
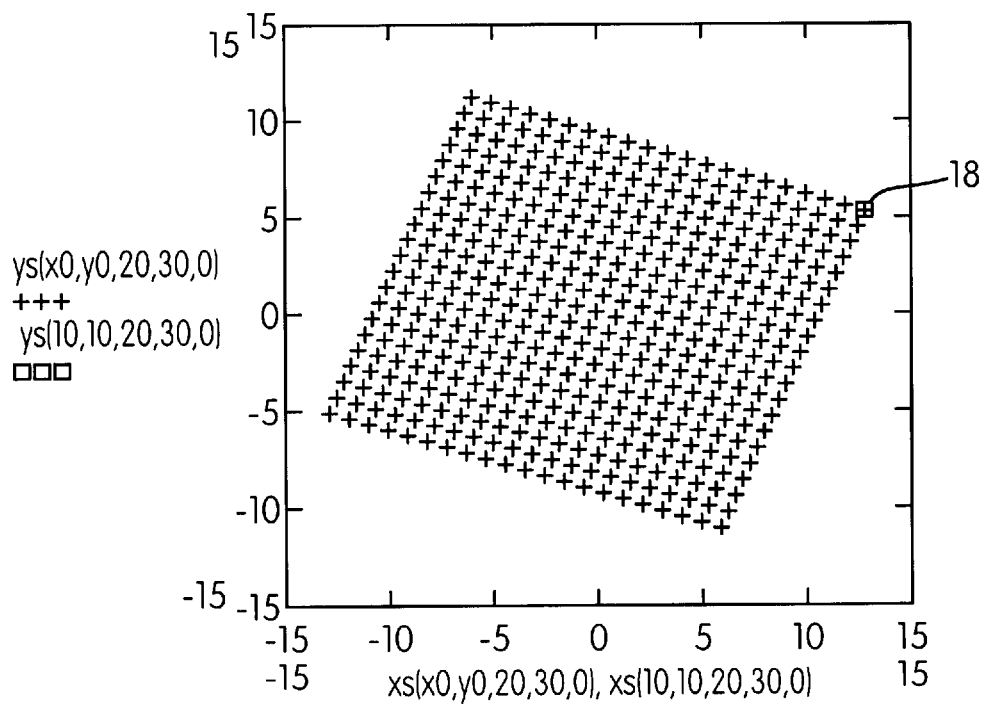
FIG. 14 is a schematic diagram of the sensor's view of an image with the sensor rotated 20° around the User Z axis and 30° around the $Y_2$-axis.
Figure 15:
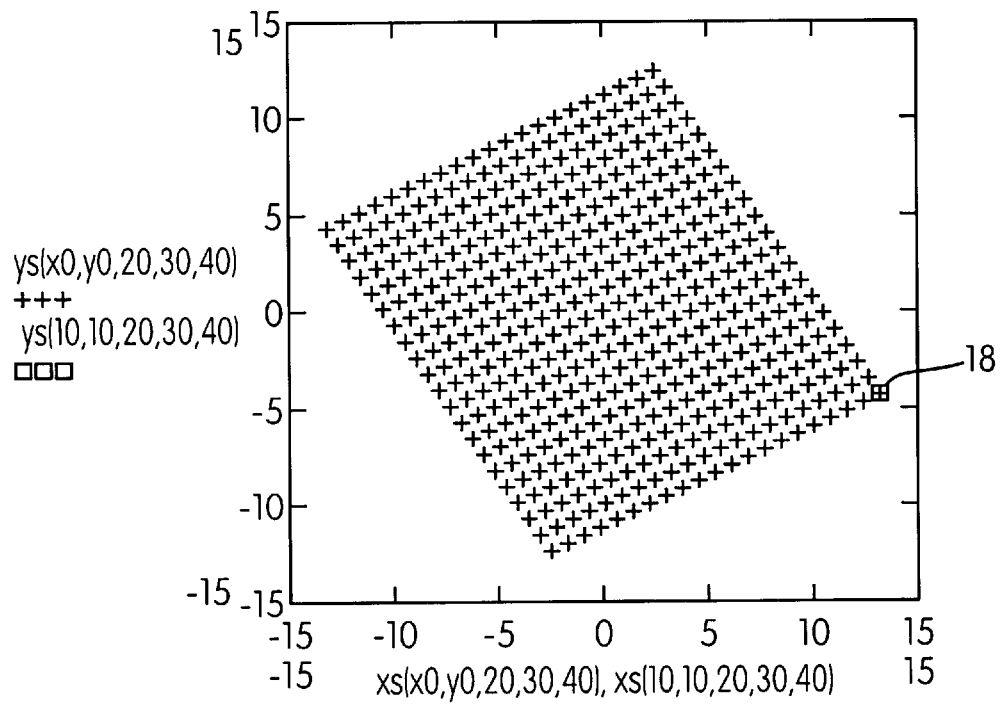
FIG. 15 is a schematic diagram of the sensor's view of an image with the sensor rotated 20° around the User Z axis, 30° around the $Y_2$-axis and 40° around the $Z_S$ axis.
Figure 16:
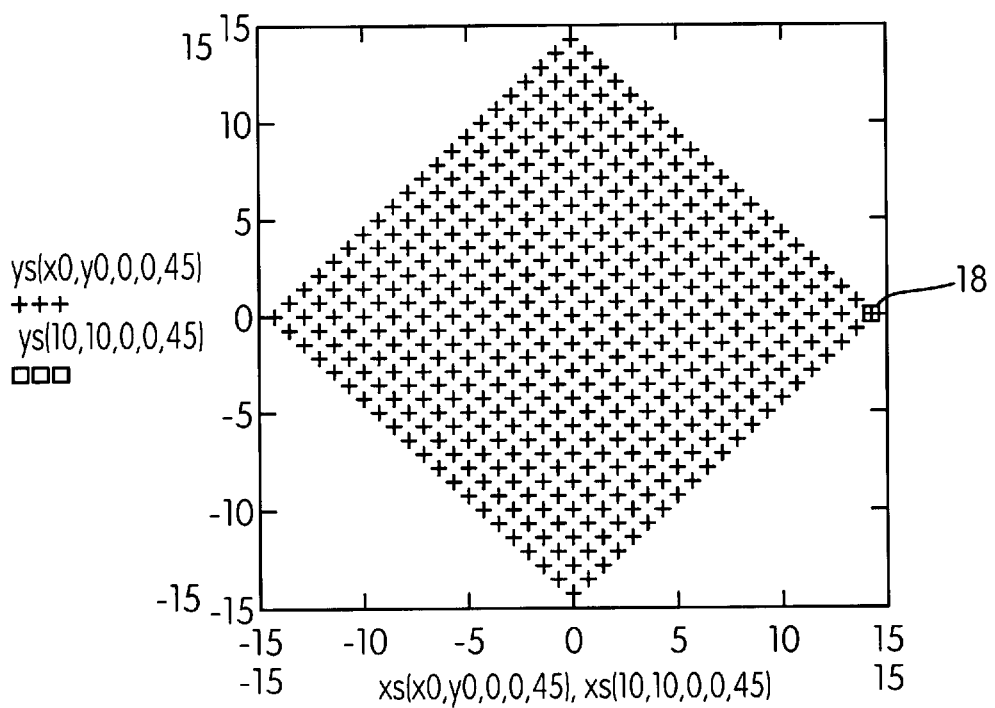
FIG. 16 is a schematic diagram of the sensor's view of an image with the sensor rotated 45° around the $Z_S$ axis.

In FIGS. 11-16, a square 18 marks the point corresponding to $X_0=10$ and $Y_0=10$ to serve as a reference point. FIG. 11 illustrates the sensor's view with the sensor in the ideal location, that is, where $\theta=0°$, $\phi=0°$, and $\psi=0°$. The sensor in this situation sees the actual movement of the ball. FIG. 12 illustrates the sensor's view of the pattern with the sensor displaced from the ideal location so that $\theta=0°$, $\phi=45°$, and $\psi=0°$. The sensor in this situation sees an image which is "compressed" along the Y-axis. FIG. 13 illustrates the sensor's view of the pattern with the sensor displaced from the ideal location so that $\theta=20°$, $\phi=0°$, and $\psi=0°$ so that the sensor simply sees a rotated image. When the sensor is displaced so as to effect both $\theta$ and $\phi$ as in FIG. 14, where $\theta=20°$, $\phi=30°$, and $\psi=0°$, then the rotated image is also compressed along its Y-axis. FIG. 15 illustrates the situation where the sensor is displaced from its ideal location so that $\theta=20°$, $\phi=30°$, and $\psi=45°$ so that the sensor sees the compressed image of FIG. 14 rotated one more time. If the displacement of the sensor away from its ideal location is such that $\theta=0°$, $\phi=0°$, and $\psi=45°$ the sensor sees maximum displacement as illustrated in FIG. 16, but no compression of the image.

FIGS. 11-16 demonstrate that the smaller the angle, the better the sensor's view. As $\phi$ is increased, the sensor's view becomes increasingly compressed along one of the axes. While this compression is compensated by the CCS transformation algorithms, larger compression in this manner will necessitate larger compensation which causes more occurrences of many-to-one mapping. The end result is that the sensor's resolving ability is diminished as $\phi$ is increased.

Many-to-one mapping refers to the situation where two different vectors in the User Vector Space are mapped to a single vector in the Sensor Vector Space due to the optical sensor's quantization error. Generally, there are two types of errors which are introduced into the transformation. One type is round-off error which is caused by transformation [A], wherein A is the matrix defined above. When the user moves the ball a certain displacement, a vector [A] is defined in the User Vector Space. The sensor, in turn, sees a vector which is the matrix inverse of [A].

$$[B]=[A]^{-1}$$

Transformation [B] therefore maps vectors from User Vector Space into the corresponding vectors in Sensor Vector Space. Transformation [A] maps vectors in the Sensor Vector Space into the corresponding vectors in Reported Vector Space. Quantization error adds to the round-off error discussed above, and two different vectors in the User Vector Space can be mapped to one vector in Sensor Vector Space. This occurs because the actual sensor vector must be rounded to a quantized sensor vector, a consequence of analog to digital conversion, and it is possible that two different vectors in the User Vector Space can be mapped to a single quantized vector due to the rounding function. The greater the number of different user vectors which are mapped to one sensor vector, the worse the performance of the system.

Consistent with the discussion of the range of values for angles $\theta$, $\phi$ and $\psi$, and the compression of the image, an increase in $\phi$ exhibits the greatest effect on many-to-one mapping as well. In other words, the more compressed the sensor's view, the more occurrences of many-to-one mapping. This was confirmed by comparing any configuration of $\theta$, $\phi$ and $\psi$ and counting the number of many-to-one mappings for each configuration. All combinations of discrete and integral counts in User Vector Space from 0 to 15, including positive and negative counts were taken into account. A floating-point calculation was used to map the user vectors into Sensor Vector Space. The corresponding sensor vectors were increased by an arbitrary incremental vector going in the same direction in order to get non-integral values that are close to the integer values quantized to the next higher absolute integer value. This new vector is called the Scaled Sensor Vector and is simply an adjustment to ensure that rounding down to the nearest integer will result in a different value for the Sensor Vector to use in calculating the Reported Vector.

The transformation algorithms of the present invention can be further enhanced by application of a number of performance improvement algorithms. One of these enhancements is the Smooth algorithm. The Smooth algorithm is compared to the Ideal which requires no transformation calculations because the sensor is in the ideal, non-rotated, position, and the Rough algorithm which is simply the application of the Transformation Equation or Algorithm SM+MAX. The Smooth algorithm mitigates the jitter that may result from the many-to-one mapping. Jitter is unintended cursor movement which can be distracting to the user. Smooth achieves this by collecting into a set the vectors in the User Vector Space which are mapped to a unique Sensor Vector and subsequently biasing the transformation so that the Reported Vector takes on the value of the smallest User Vector in the set. The "smallest" is the shallowest-angled vector in the User Vector Space. To illustrate, User Vectors of (Xu=0, Yu=0) and (Xu=1, Yu=1) may be seen at the sensor as Sensor Vector (Xs=1, Ys=0) as a result of the sensor being positioned away from the ideal. The Reported Vector may be calculated to be either (Xr=0, Yr=0) or (Xr=1, Yr=1). Jitter would have been observed if User Vector (Xu=0, Yu=0) caused a Reported Vector of (Xr=1, Yr=1), that is, counts were reported for no user movement. Smooth ensures that the transformation for this case results in a Reported Vector (Xr=0, Yr=0), the value of the smallest User Vector in the set. This has the effect of biasing the reports toward the Cartesian axes. This means that Smooth improves performance at the Cartesian axes where errors are most noticeable, at the expense of regions away from the axes.

Another improvement algorithm is a Median Mapping algorithm which is designed to decrease the total error of the system by reducing the contribution of the quantization error on the sensor vector. This is accomplished by biasing the transformation so that the Reported Vector for any given User Vector is the median/centroid of the zone/range of vectors in User Vector space that would cause one unique Sensor Vector to be detected by the sensor. The zone is, in effect, many-to-one mapped to the abovementioned Sensor. In other words, when a vector is detected by the sensor, there is a range of possible User Vectors which correspond to the Sensor Vector, i.e., the many-to-one mapping. The Median Mapping algorithm is applied to the Sensor Vector and biases the transformation so that the Reported Vector is the median within the range of User Vectors which correspond to the above unique Sensor Vector. This is a good compromise within the scope of an inexpensive microcontroller's capabilities which does not enable more elaborate differentiation.

A preferred improvement algorithm termed the Fixed Point Algorithm is employed in the transformation to mitigate the effects of rounding. The Fixed Point algorithm is a way of representing fractional numbers with integers having the radix point moved within the integer. The radix point refers to the character or point that separates the integer from the fractional values in positional number systems. For example, in the fixed-radix decimal number system, the radix point is the decimal point. In the fixed-radix binary number system the radix point is generally termed the binary point. Specifically, the single digit fixed point algorithm uses bit 0 (zero) to represent a 0.5 which means that the radix point is between bit 0 and bit 1. Using the single digit fixed point algorithm increases the mapping resolution from one count to half a count because any non-integer number is rounded to the nearest 0.5 instead of the next integer. The improved mapping resolution is available only if the angles selected for the single digit fixed point algorithm result in coefficients that can be represented by 6 bits. The bit positions are used as follows:

| | |
|---|---|
| Bit 7 | Sign bit |
| Bit 6 . . . 1 | Integer value of coefficient a, b, c, d |
| Bit 0 | Single digit fixed point. |

The single digit fixed point algorithm results in the smallest percentages of error for vector magnitude from a systematic continuous point of view even at the slowest speeds. The highest percentage error in vector magnitude using the single digit fixed point algorithm was only approximately 13%. The other improvement algorithms yield significantly higher percentage errors in vector magnitude, especially at the lowest speeds.

To evaluate the performance of the various improvement algorithms from a systematic continuous point of view the Spokes Test was employed. The Spokes Test consists of a fixed-magnitude vector swept from 0 to 359 degrees in 5 degree increments. The angle sweep ensures that quantization is factored into the systematic error. The vector magnitude was chosen to be large enough to encompass multiple reports to ensure a continuous stream of vectors were used as stimuli for the system. The Spokes Test was performed by sweeping the vector at various speeds, measured in inches/second. This was necessary to consider the possibility that error would depend on the speed of the vector sweep. The vector sweep speed simulating the movement of the reading surface and the detected vectors.

The Spokes Test revealed that the single digit fixed point improvement algorithm resulted in the smallest percentage errors over the range of the vector sweep. Therefore, the single digit fixed point algorithm is implemented in the preferred embodiment since it provides finer mapping resolution and the lowest amount of error.

In an optical trackball pointing device, the transformation equation is provided in the microcontroller which processes the counts detected by the counter associated with the optical sensor. These detected counts are transformed by the transformation equation and any appropriate performance improvement algorithms into reported counts which are employed by the system to output on-screen movement of the cursor corresponding to the movement of the ball by the user. The possibility of displacing the optical sensor away from its ideal location provides previously unavailable design freedom and eliminates contaminant problems.

The foregoing explanation includes many variations and embodiments, and the invention is not intended to be limited to the specific details disclosed herein, but only by the claims appended hereto.

What is claimed is:

1. A method for providing signals from a computer input device having a ball adapted to be rotationally manipulated by a user in a user vector space to a host PC, said method comprising:

providing a microcontroller coupled to a sensor positioned at a first location parallel to a plane tangent to the ball, the sensor disposed in a sensor vector space;

detecting rotational movement of the ball by the sensor and producing a detected vector motion report correlating to the rotational position of the ball;

converting the detected vector report into a reported vector report which simulates a detected vector report that would be produced by a sensor positioned at a second location parallel to another plane tangent to the ball, the reported vector report disposed in a reported vector space; and processing the reported vector report into input signals to the host PC to correlate movement of the ball to movement of an on-screen cursor.

2. The method of claim 1, wherein the step of converting includes the step of mapping vectors from a user vector space to a sensor vector space.

3. The method of claim 2, wherein the step of converting includes the step of mapping vectors from a sensor space to a reported space.

4. The method of claim 1, wherein the step of converting the detected vector report into a reported vector report is accomplished by comparing detected vector reports to corresponding reported vector reports in a table.

5. The method of claim 1, wherein the step of converting the detected vector report into a reported vector report includes error correction to eliminate at least one round-off error necessitated by employing the table of values.

6. The method of claim 1, wherein the second location is diametrically opposed to an ideal user contact point such that said converting accounts for angular displacement of the sensor away from the second location.

7. A method of transforming a signal detected by a sensor in a first sensor location to an input signal for a monitor which simulates a signal detected by a sensor in a second sensor location, said method comprising the steps of:

receiving detected signals at the first sensor location correlating to movement of a pattern relative to the sensor;

processing the detected signals by applying transformation equations to simulate corresponding signals that would be detected by a sensor in a second location; and processing the transformed signals into an input signal for a monitor to correlate movement of a pattern to movement of a point on the monitor.

8. The method of claim 7, wherein said step of processing the detected signals includes a step of transforming the detected signals to signals representing a mirror image of the movement of the pattern.

9. The method of claim 7, wherein said step of processing the transformed signals includes the step of selecting a transformation equation based on the displacement between the first sensor location and the second sensor location.

10. The method of claim 9, wherein said step of selecting a transformation equation is based on the angular displacement between the first sensor location and the second sensor location about a first axis of rotation.

11. The method of claim 10, wherein said step of selecting a transformation equation is based on the angular displacement between the first sensor location and the second sensor location about a second axis of rotation.

12. A method of converting detected signals into reported signals, the detected signals representing movement of a pattern relative to an optical sensor in a first location and the reported signals representing simulated movement of the pattern which would be detected if the optical sensor were in a second location, the second location corresponding to a user contact point of the pattern, said method comprising the steps of:

determining a conversion factor based on the displacement between the first location and the second location; and applying the conversion factor to convert the detected signals into reported signals.

13. The method of claim 12, wherein said step of determining the conversion factor includes the steps of:

defining a first vector space as that occupied by the user contact point;

defining a second vector space as that occupied by the optical sensor;

defining a third vector space as that occupied by the simulated optical sensor, wherein the reported signals also occupy the third vector space; and transforming movement of the pattern at the user contact point in the first vector space into the detected signals in the second vector space.

14. The method of claim 13, wherein the step of determining the conversion factor further includes the step of transforming the detected signals in the second vector space into reported signals in the third vector space such that the reported signals simulate signals which would be detected by a sensor in the second location.

15. The method of claim 14, wherein said step of transforming detected signals into reported signals includes the step of comparing detected counts with a table of look-up values to determine the appropriate reported signal.

16. The method of claim 15, wherein said step of transforming detected signals into reported signals includes the step of error correction to account for round-off error.

17. The method of claim 16, wherein said step of transforming detected signals into reported signals includes the step of error correction to account for multiple values of detected vector values mapping to a single reported vector value.

18. An optical pointing apparatus for controlling on-screen cursor movement of a monitor comprising:

a housing;

a ball with a predetermined all-over pattern coupled to said housing for rotation therein, said ball partially extending from said housing to present an ideal user contact location to enable rotational manipulation of said ball, the ideal user contact location defining a user vector space, the ideal user contact location also defining an ideal sensor location which is diametrically opposed thereto and parallel to a plane tangent to the ball;

a sensor disposed in said housing parallel to a plane tangent to the ball to detect movement of said ball by reading the pattern as it moves relative to said sensor, the sensor being angularly displaced from the ideal sensor location and occupying a sensor vector space; and a microcontroller disposed in said housing and associated with said sensor, said microcontroller containing instructions to transform detected movement of the ball from said sensor into reported movement of the ball, reported movement being a simulation of detected movement if the sensor were in the ideal sensor location, the simulated movement occupying a reported vector space.

* * * * *

UNITED STATES PATENT AND TRADEMARK OFFICE
CERTIFICATE OF CORRECTION

PATENT NO. : 6,631,303 B1  Page 1 of 1
DATED : October 7, 2003
INVENTOR(S) : Ceasar B. de Leon et al.

It is certified that error appears in the above-identified patent and that said Letters Patent is hereby corrected as shown below:

<u>Column 7,</u>
Line 57, "counts $\leqq$ 15" has been replaced with -- counts $\leq$ 15 --;

<u>Column 8,</u>
Line 7, "$N_{xs}*N_{ys} \geqq 0$" has been replaced with -- $N_{xs}*N_{ys} \geq 0$ --;

<u>Column 8,</u>
Between lines 35-40, "$N_{xs}*N_{ys} \geqq 0$" has been replaced with -- $N_{xs}*N_{ys} \geq 0$ --;

<u>Column 9,</u>
Line 7, "sy*sy $\geqq$ 0" has been replaced with -- sy*sy $\geq$ 0 --;
Line 35, "$N_{xs} \leqq 15$ and $N_{ys} \leqq 15$" has been replaced with -- $N_{xs} \leq 15$ and $N_{ys} \leq 15$ --;
Line 59, "s" has been replaced with -- $\Phi$ --;

<u>Column 10,</u>
Line 22, -- $\Phi$ -- has been inserted after "the smaller the angle".

Signed and Sealed this

Eighth Day of June, 2004

JON W. DUDAS
*Acting Director of the United States Patent and Trademark Office*